United States Patent Office 3,793,401
Patented Feb. 19, 1974

3,793,401
STABILIZED POLYMER BLENDS
Eric Nield and Philip Anthony Staniland, Welwyn Garden City, England, assignors to Imperial Chemical Industries Limited, London, England
No Drawing. Filed Nov. 27, 1970, Ser. No. 93,390
Claims priority, application Great Britain, Nov. 27, 1969, 58,156/69
Int. Cl. C08f 45/58
U.S. Cl. 260—876 R 10 Claims

ABSTRACT OF THE DISCLOSURE

The use of up to 20% by weight of organic anhydrides as stabilizers in polymer compositions containing at least 50 mole percent of polymerized unsaturated nitriles such as acrylonitrile and methacrylonitrile, and at least 5% by weight of a diene rubber. The anhydrides are selected from anhydrides of cyclic dicarboxylic acids, polymeric anhydrides and polymeric acids which lose water on heating to form polymeric anhyfdrides.

---

The invention relates to the stabilization of polymer compositions containing a diene rubber and polymerized units of an ethylenically unsaturated nitrile.

During melt processing of polymerizing nitriles such as acrylonitrile and methacrylonitrile where the polymer is subjected to high temperatures, considerable degradation can take place. This manifests itself as a darkening of the color, and as an increase in the melt viscosity of the polymeric material. The presence of a diene rubber increases the susceptibility to degradation, and in copolymers of acrylonitrile and methacrylonitrile this susceptibility also generally increases with increasing acrylontrile and methacrylonitrile content.

According to the present invention, we provide a composition comprising (A) 80 to 99.9% by weight of a polymeric material having a resin component containing at least 50 mole percent of at least one polymerized ethylenically unsaturated nitrile and a rubber component containing a diene rubber where the diene rubber comprises at least 5% by weight of the polymeric material, and (B) 0.1 to 20% by weight of a stabilizer selected from cyclic anhydride of cyclic dicarboxylic acids, polymeric anhydrides, and corresponding polymeric acids (and their derivatives) which lose water on heating to form the said polymeric anhydrides. The resin component of the polymeric material may be homopolymer of acrylonitrile or methacrylonitrile or a copolymer of acrylonitrile or methacrylonitrile with other ethylenically unsaturated compounds copolymerizable therewith, or a mixture of such polymers, where at least 50 mole percent of the resin component consists in units of the nitrile monomer or monomers. The diene rubber contains from 40 to 100% molar of at least one conjugated 1,3-diene monomer and from 0 to 60% molar of at least one other ethylenically unsaturated monomer copolymerizable with free radical catalysts. The diene rubber may be blended directly with the nitrile resin component, or it may form the substrate of graft copolymer on which is grafted a nitrile-containing superstrate. The stabilizers are particularly useful for the stabilization of blends of a resins which is a homopolymer or copolymer of an ethylenically unsaturated nitrile and a graft copolymer which comprises a diene rubber substrate and a nitrile-containing superstrate.

Degradation of nitrile-containing polymers which occurs at elevated temperatures, such as those employed during moulding, is thought to occur by a rearrangement of the nitrile groups to form a nitrogen bridge between adjacent nitrile carbon atoms, forming a second chain linked with the polymer carbon chain and composed of the repeated conjugated units

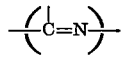

Cross-linking is thought to be brought about by the formation of such a linkage between the nitrile carbon atoms on different polymer chains. As the proportion of comonomer units increases in a copolymer at the expense of acrylonitrile, the length of uninterrupted runs of consecutive acrylonitrile units is reduced, and hence the possibility of degradation diminishes. Thus, the stabilizers of the present invention are of particular interest where the resin component contains high quantities of nitrile, in particular when the resin component of the polymeric material comprises at least 70 mole percent of units of the polymerized nitrile.

The stabilizers of the present invention are particularly suitable for stabilizing graft copolymers comprising a substrate of a diene rubber and a superstrate of acrylonitrile and aromatic olefin in which the units of aromatic olefin are randomly distributed in the polymer molecule and in which the molar ratios of acrylonitrile to aromatic olefin in the range 2:1 to 9:1 as described in British specification 1,185,306 or within the range 9:1 to 20:1; polymeric material containing methacrylonitrile and a diene rubber as described in British specification 1,204,476; graft copolymers comprising a diene rubber substrate and a superstrate of an acrylonitrile copolymer where the comonomers are other than aromatic olefins as described in British specification 1,143,408; blends of the above grafts with compatible resins; random copolymers of acrylonitrile and aromatic olefins having molar ratios of acrylonitrile to aromatic olefins in the range 2:1 to 6:1 as described in British specification 1,185,305 or in the range 6:1 to 20:1 when they are blended with compatible diene rubber-based graft copolymers; copolymers of acrylonitrile and comonomers other than aromatic olefins as described and claimed in British specifications 1,086,673 and 1,088,758 when blended with compatible diene rubber-base graft copolymers.

The stabilizers are selected from cyclic anhydrides of cyclic dicarboxylic acids, polymeric anhydrides, and corresponding polymeric acids and their derivatives which lose water on heating to form the said polymeric anhydrides. Cyclic anhydrides of acyclic-unsaturated $\alpha,\beta$-dicarboxylic acids were also examined but none was found which provided any substantial stabilization. Among those which were found to be ineffective and which are outside the scope of the present invention are maleic and succinic anhydrides. Examples of the anhydrides of cyclic dicarboxylic acids which may be used according to the invention are phthalic anhydride, naphthalic anhydride and 3,6-endo-oxa-hexahydrophthalic (I)

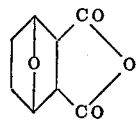

(I)

anhydride; of these the preferred anhydride is phthalic anhydride. The polymeric anhydrides may, for example, be maleic anhydride copolymers such as ethylene/maleic anhydride copolymer and $\alpha$-methyl styrene/maleic anhydride copolymer. The polymeric acids may for example be methyl methacrylate/methacrylic acid copolymer, styrene/methacrylic acid copolymer or polyacrylic acid.

The quantity of stabilizer to be incorporated into the polymeric material depends on the degree of stabilization required and on the required mechanical properties. It will also depend on the proportion of anhydride or acid in the stabilizer selected. Thus, for example, when the selected stabilizer is a styrene/methacrylic acid copolymer, containing only a small proportion of methacrylic acid, a greater quantity of the copolymer would be required to achieve the same degree of stability than of a copolymer containing a larger amount of methacrylic acid. In general it is sufficient to use the stabilizers in quantities not greater than 20% by weight of the polymeric material although for most purposes up to 10% by weight of stabilizer is preferred. Although some improvement in the stability may generally be achieved by using as little as 0.1% by weight of the stabilizer, it is preferable to use at least 0.5 % by weight of the stabilizer.

The stabilizers may be incorporated into the polymeric material at any convenient time after the polymerization reactions forming the components of the polymeric material have been completed. Thus the polymeric stabilizers may be added to the polymerization reaction mixture before isolation of the polymeric material. When graft copolymers are latex blended with resins, it is very convenient to incorporate the stabilizers while carrying out the blending operation. However, for the monomeric stabilizers, that is the anhydrides of the cyclic, $\alpha,\beta$-dicarboxylic acids, susbtantial loss of stabilizer may occur during polymer work-up if they are incorporated in the system before that stage. It is therefore preferable to incorporate the stabilizers, particularly the monomeric stabilizers, during compounding of the polymeric material. The polymeric matreials may also be mixed with any desired fillers and lubricants.

Compositions of the present invention may be fabricated by any method available to the processing of thermoplastic materials. The compositions can therefore be compression moulded; blow moulded; extruded; calendered and cast into films, moulded into plaques, bottles and other articles. The improved heat stability of the composition leads to generally satisfactory reprocessing.

In order to compare the stability of prepared materials at elevated temperatures, about 15 g. of the material was loaded into a cylindrical container thermostatically controlled at the required temperature, generally about 260° C. The container had an internal diameter of 1 cm., and a length of 20 cm. One end of the cylinder was fitted with a die having an internal diameter of 0.5 mm. and a length of 3.2 mm. The polymer was heated for three minutes, and then a small portion was extruded through the die by a ram moving at a speed of 0.0156 cm. s.$^{-1}$, the polymer being extruded through the die at a shear rate of 1000 s.$^{-1}$. The stress necessary to maintain this shear rate was measured using a pressure gauge fitted to the ram, and the viscosity calculated by the ratio of the measured stress to the shear rate. While maintaining the bulk of the material at a temperature of 260° C., further samples of the material were extruded at convenient time intervals. Observations of the changes with time of the viscosity, extrudate quality and color, were recorded as a measure of the thermal stability of the polymer melt at the measuring temperature.

The invention is illustrated by the following examples.

EXAMPLE 1

A rubber resin blend was prepared by blending a latex of a graft copolymer (comprising equal amounts of a substrate of polybutadiene and a superstrate of random acrylonitrile/styrene copolymer containing 75 mole percent acrylonitrile and 25 mole percent styrene) and a resin latex (comprising a random acrylonitrile/styrene copolymer containing 75 mole percent acrylonitrile and 25 mole percent styrene), the ratio of the components being such that the final dry blend contained 10% polybutadiene. 2,6-di-tertiary-butyl-4-methylphenol (1% by weight of final blend) and diluaryl thiodipropionate (0.5% by weight of final blend) were added as aqueous dispersion to the latex blend prior to coagulation with an equal volume of a 1% aqueous magnesium sulphate solution at 75° C. The coagulum was washed with water, then twice with methanol and finally twice with water, and then dried.

The anhydride stabilizers of the present invention were added to the dried blend powder and mixed in a Henschel mixer. The blend was then compounded on a Banbury mixer and finally on a two roll mill.

Blends containing 0, 1 and 2% of phthalic anhydride were prepared according to the above procedure and submitted to the ram extruder melt stability test at 260° C., as hereinbefore described. The blends were also injection moulded into discs 11.4 cm diameter and 0.32 cm. thick, and mechanical properties of these discs were measured. The results obtained are given in Table I.

After prolonged heating at 260° C., the viscosity of some of the materials showed a sudden increase, and the period of heating required to produce the sudden change in viscosity is given in the table as the "time to set up." In each table, where the time to set up is given as greater than a specific time, the test was discontinued at that time. The Charpy notched impact test was carried out at room temperature (about 20° C.). A specimen 60 mm. long, 6.5 mm. wide and 3 mm. thick was given a 45° notch 2.5 mm. deep (tip radius 0.25 mm.) in the center of one edge. The specimen was supported between two supports 5 mm. apart and struck centrally on the edge opposite the notch by a pendulum dropping from 30 cm. with more than sufficient energy to break the specimen. From the residual energy of the pendulum, the energy required to break the specimen was calculated and divided by the cross sectional area of the specimen at the notch. The resulting value represents the energy required to break the material.

TABLE I

| Percent phthalic anhydride (percent by weight) | Time to set up at 260° C. | Notched impact strength, ft. lb/in.$^2$ | Flexural modulus, dynes/cm.$^2$ |
|---|---|---|---|
| 0 | 50 minutes | 6 | 2.9×10$^{10}$ |
| 1 | 90 minutes | | |
| 2 | >135 minutes | 5.7 | 3.1×10$^{10}$ |

EXAMPLE 2

In the following experiments a blend as described in Example 1 was mixed with stabilizers identified in Table II. In compounds b and f, stabilizer was added to the powdered blend in a small powder mixer and then the sample compression moulded at about 180° C., prior to testing on the ram extruder at 260° C. In compounds c, d and e, the stabilizer was added to the blend in the manner described in Example 1.

TABLE II

| | Stabilizer (percent by weight) | Time to set up at 260° C. |
|---|---|---|
| Compound— | | |
| a | None | 65 minutes. |
| b | 1% naphthalic anhydride | 90 minutes. |
| c | 1% phthalic anhydride | Do. |
| d | 2% phthalic anhydride | >110 minutes. |
| e | 1% ethylene/maleic anhydride copolymer. | 70 minutes. |
| f | 1% 3,6-endo-oxa-hexahydro-phthalic anhydride. | Do. |

In each of the above cases b–f, the rate of color formation was suppressed by the stabilizer. Samples a, b, c, e, and f were injected moulded into discs 11.43 cm. diameter and 0.32 cm. thick. On molding at 230° C. all the stabilized polymers gave discs which were less colored than the unstabilized material and this superiority was very much more noticeable on molding at temperatures of 260° C. and 280° C.

EXAMPLE 3

In this example blends of the graft copolymer and the resin were prepared as described in Example 1, except that in some cases methanol washing was omitted. Stabilizers were incorporated in the manner described for compounds b and f of Example 2. Results of the ram extruder test are given in Table III.

TABLE III

| Compound— | Stabilizer (percent by weight) | Time to set up at 260° C. | With/without methanol washing |
|---|---|---|---|
| g | None | 40 minutes | Without. |
| h | 2% phthalic anhydride | >95 minutes | Do. |
| j | 2% styrene/methacrylic acid copolymer | 75 minutes | Do. |
| k | None | 50 minutes | With. |
| l | 2% phthalic anhydride | >80 minutes | Do. |
| m | 2% styrene/methacrylic acid copolymer | Did not set up in 90 minutes. | Do. |

EXAMPLE 4

In this example the graft copolymer consisted of a substrate of polybutadiene and a superstrate of acrylonitrile/isobutene (70/30 molar) copolymer in approximately equal proportions by weight.

The resin phase was a random acrylonitrile/styrene (80/20 molar) copolymer. The blend contained 10% rubber and was coagulated with a 1% aqueous aluminium sulphate solution at 75° C., and washed with water. No methanol was employed in the washing. Stabilizer was added as described in Example 1 and the results are recorded in Table IV.

TABLE IV

| Compound— | Stabilizer (percent by weight) | Time to set up at 260° C |
|---|---|---|
| n | None | 25 minutes. |
| o | 2% phthalic anhydride | 35 minutes. |

EXAMPLE 5

Blends of graft copolymers and resins were prepared as described in Example 1, except for compounds w and x which were coagulated with ethanol, and stabilizers were added by the method described for compounds b and f of Example 2. The results obtained are given in Tables V, VI and VII.

TABLE V

| Compound— | Stabilizer (percent by weight) | Time to set up at 260° C. | Time to become brown at 260° C. |
|---|---|---|---|
| p | None | 60 minutes | 60 minutes. |
| q | 2% of methacrylic acid/methacrylate copolymer (50:50 molar) | >80 minutes | >80 minutes. |
| r | 1% phthalic anhydride | >90 minutes | >90 minutes. |
| s | 1% ethylene/maleic anhydride copolymer | >100 minutes | >100 minutes. |
| t | 5% ethylene/maleic anhydride copolymer | >100 minutes | >100 minutes. |

TABLE VI

| Compound— | Stabilizer (percent by weight) | Time to set up at 260° C. | Time to become brown at 260° C. |
|---|---|---|---|
| u | None | 50 minutes | 50 minutes. |
| v | 2% styrene/methacrylic acid copolymer (35:65 molar) | >90 minutes | >90 minutes. |

TABLE VII

| Compound— | Stabilizer (percent by weight) | Time to set up at 260° C. | Time to become brown at 260° C. |
|---|---|---|---|
| w | None | 110 minutes | 90 minutes. |
| x | 5% polyacrylic acid | >140 minutes | >140 minutes. |

We claim:

1. A composition comprising (A) 80 to 99.9% by weight of a polymeric material having a resin component containing 50-100% molar of units of an ethylenically unsaturated nitrile and 0-50% molar of an ethylenically unsaturated monomer copolymerizable therewith and a rubber component containing 40-100% molar of at least one conjugated 1,3-diene monomer and from 0-60% molar of at least one other ethylenically unsaturated monomer copolymerizable therewith using a free radical catalyst where the diene rubber comprises at least 5% by weight of the polymeric material, and (B) 0.1 to 20% by weight of a stabilizer selected from the group consisting of phthalic anhydride, naphthalic anhydride and their hydrogenated derivatives, polymeric anhydrides containing 50-100% molar maleic anhydride and 0-50% molar of an alkene, polymeric anhydrides of 50-100% molar acrylic and/or methacrylic acid and 0-50% molar of another monoethylenically unsaturated monomer copolymerizable therewith, and corresponding polymeric acids which lose water on heating to form the said polymeric anhydride.

2. A composition according to claim 1 in which the nitrile is a member of the group consisting of acrylonitrile and methacrylonitrile.

3. A composition according to claim 1 in which the polymeric material is a blend of the resin component and a graft copolymer which comprises said rubber component as a substrate and said resin component as a superstrate.

4. A composition according to claim 1 in which the stabilizer is present in concentration between 0.5% and 10% by weight.

5. A composition according to claim 1 in which the stabilizer is phthalic anhydride.

6. A composition according to claim 1 in which the stabilizer is a homopolymer and/or a copolymer of methacrylic acid.

7. A composition according to claim 1 in which the stabilizer is a maleic anhydride copolymer.

8. A composition according to claim 1 in the form of a moulded article.

9. A composition according to claim 8 in which the moulded article is a bottle.

10. A composition according to claim 1 in the form of a film.

References Cited

UNITED STATES PATENTS

| 2,841,569 | 7/1958 | Rugg et al. | 260—45.7 |
| 3,356,644 | 12/1967 | Lee | 260—45.95 |
| 3,352,820 | 11/1967 | Bawn | 260—45.75 |
| 3,222,422 | 12/1965 | Cohen | 260—876 |
| 3,231,524 | 1/1966 | Simpson | 260—2.5 |
| 3,442,980 | 5/1969 | Grabowski | 260—880 |
| 3,489,821 | 1/1970 | Witt et al. | 260—876 |
| 3,549,725 | 12/1970 | Rose et al. | 260—876 |
| 3,499,950 | 3/1970 | Weitzel et al. | 260—876 |
| 3,314,914 | 4/1967 | Suling et al. | 260—32.2 |
| 2,675,370 | 4/1954 | Barrett | 260—78.5 |
| 2,971,939 | 2/1961 | Baer | 260—78.5 |
| 3,642,949 | 2/1972 | Stafford et al. | 260—876 |
| 3,671,607 | 6/1972 | Lee | 260—876 |
| 3,242,135 | 3/1966 | Bown et al. | 260—45.85 |

DONALD E. CZAJA, Primary Examiner

R. A. WHITE, Assistant Examiner

U.S. Cl. X.R.

260—45.8 A, 887, 889